Oct. 21, 1952 — W. L. McGRATH — 2,614,394
CAPACITY CONTROL FOR AIR CONDITIONING SYSTEMS
Filed Nov. 20, 1946 — 2 SHEETS—SHEET 1

INVENTOR.
William L. McGrath
BY

Oct. 21, 1952 W. L. McGRATH 2,614,394
CAPACITY CONTROL FOR AIR CONDITIONING SYSTEMS
Filed Nov. 20, 1946 2 SHEETS—SHEET 2

INVENTOR.
William L. McGrath
BY

Patented Oct. 21, 1952

2,614,394

UNITED STATES PATENT OFFICE 2,614,394

CAPACITY CONTROL FOR AIR CONDITIONING SYSTEMS

William L. McGrath, Syracuse, N. Y., assignor to Carrier Corporation, Syracuse, N. Y., a corporation of Delaware Application November 20, 1946, Serial No. 711,156

7 Claims. (Cl. 62—3)

This invention relates to a system of capacity control and, more particularly, to an air conditioning system in which means are provided for attaining capacity control.

Accurate capacity control of air conditioning systems is necessary to obviate unsatisfactory performance under conditions of partial load. Unsatisfactory performance under conditions of partial load is a handicap inherent in many comfort cooling systems, and is a factor making for public dissatisfaction. In cooling air, the maintenance of a steady state condition requires matching the capacity of the equipment which performs the cooling against the load; in other words, heat must be removed by the cooling equipment at the same average rate at which it is produced at the load source. Load change creates a problem of temperature control; temperature control may be defined as the regulation of capacity of the heat absorbing equipment to match the change in load without exceeding permissible limits of variation. In the cooling of air, it is essential to effect necessary removal of undesirable absolute humidity while providing for delivery of the dehumidified air at a dry bulb temperature not too cold for comfort.

Various attempts have been made to solve the problem. For example, regulation of the compressor has been attempted to reduce the useful pumping effect of the refrigerating machine in accordance with changes in evaporator load. Frequently, such procedure is unsatisfactory, for merely changing the useful pumping effect necessarily changes the temperature of the evaporator surface and, consequently, the moisture condition of the air passing therethrough, even though a desired dry bulb temperature can be obtained. Regulation of the evaporator has also been attempted. Such regulation is often undesirable for freezing results if the system be operated at a sufficiently low temperature to remove all the necessary moisture. If the air passing through the evaporator is cooled only partially, not below its dew-point, as, for example, under partial load or during intermediate season conditions where very little cooling is needed but where the production of comfortable air conditions requires some moisture removal, then insufficient moisture will be removed to obtain the desired relative humidity, and clammy or damp conditions will result. Similarly, the use of systems employing large physical bypasses is not viewed favorably because of the large equipment and central station systems required, wasting or rendering unavailable useful space.

Another method heretofore employed requires the use of steam for reheat purposes; that is, the refrigerating machine may operate at capacity to provide automatically the desired dew-point for moisture control regardless of variations in load, but the air subsequent to dehumidification at a relatively low temperature is reheated with steam to provide a comfortable final temperature. While this proposal provides adequate conditions, the additional coils and equipment required are excessively large and expensive to install and operate since all of the air is first dehumidified and then all of the air is reheated and circulated. Steam is not always readily available during summer and intermediate season conditions in many business establishments and in residences; in addition, the cost of the steam employed for reheat purposes serves to increase considerably the total cost of conditioning air supplied to the structure being treated.

A principal object of this invention is to eliminate disadvantages inherent in previous methods and to provide means for obtaining capacity control of air conditioning systems.

An object of the invention is to provide a refrigeration system including means for varying the capacity of the system in response to the load imposed thereon, while permitting desired final conditions of temperature and humidity to be obtained under conditions of partial load.

A further object is to provide an air conditioning system in which the rate of moisture removal as well as the rate of sensible heat absorption may be correlated and desirably controlled.

A still further object is to provide a refrigeration system including reheat control without increasing the coil surface required in the system.

A still further object is to provide a refrigeration system embodying self-compensating control means for varying the capacity thereof in accordance with the load imposed on the system. Other objects of my invention will be readily perceived from the following description.

This invention relates to a refrigeration system which comprises, in combination, a compressor, a condenser, and an evaporator disposed in a closed circuit, means in said circuit for metering the amount of condensed or cooling refrigerant passing to the evaporator, the evaporator including a plurality of separate passages for the evaporation of refrigerant, means connecting the compressor with one of said passages, and control means for regulating the flow of heating fluid from the compressor to another of said evaporator passages. If desired, automatic means may be provided for actuating the control means in response to the temperature of air being directed through the evaporator.

This invention further relates to a capacity control for an air conditioning system, including means for adjusting the temperature and moisture content of air passing therethrough. Such means may include an evaporator and a compressor, the evaporator including a plurality of passages for the evaporation of cooling fluid, means connecting the compressor to at least one of said passages, and control means for regulating the supply of heating fluid from the compressor to such passage.

This invention further relates to a method of providing capacity control for an air conditioning system in which the steps comprise passing cooling or condensed fluid to a plurality of passages in an evaporator to adjust the temperature and moisture content of air passing through the evaporator; discontinuing, in response to a decrease in the temperature of air passing therethrough, the supply of cooling or condensed fluid to at least a portion of one of said passages while continuing to direct cooling fluid into the remaining passages; and passing heating fluid into at least a portion of said passages in response to a further decrease in the temperature of air directed therethrough.

The attached drawings illustrate certain preferred embodiments of my invention, in which Figure 1 is a diagrammatic view of the refrigerating and air conditioning system of my invention;

Figure 1:
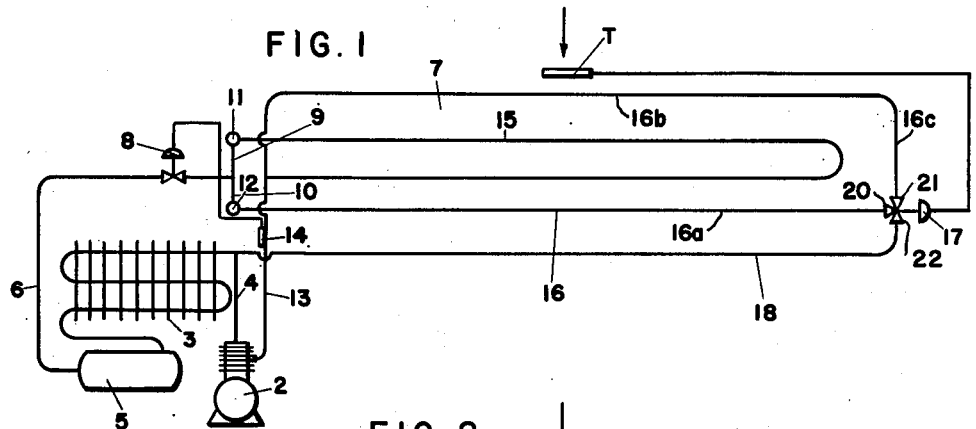

Referring to the drawings, there is illustrated in Figure 1 a refrigerating system which comprises a compressor 2 connected to a condenser 3 by discharge line 4. A liquid receiver 5 may be provided to receive condensed refrigerant from condenser 3. Liquid line 6 connects receiver 5 to an evaporator 7. Disposed in line 6 is a thermal expansion valve 8 of usual construction adapted to regulate the amount of refrigerant supplied to evaporator 7. Lines 9 and 10 connect line 6 to evaporator 7. Any suitable types of restrictions 11 and 12 are disposed in lines 9 and 10 between expansion valve 8 and evaporator 7; restrictions 11 and 12 serve to distribute refrigerant equally between the various coils forming evaporator 7. Suction line 13 connects evaporator 7 with compressor 2. Thermal bulb 14 is disposed adjacent suction line 13 and is responsive to superheat of refrigerant leaving evaporator 7 to control the operation of expansion valve 8 in the usual manner.

Evaporator 7 contains a plurality of separate sections 15 and 16 forming passages for refrigerant. Section 15 of evaporator 7 is connected to line 6 by line 9, and is connected to suction line 13. Expansion valve 8 and restriction 11 regulate the amount of refrigerant passing into section 15. The gaseous refrigerant from section 15 passes into line 13 and is drawn into compressor 2.

Section 16 includes portion 16a which extends across the leaving air end of evaporator 7, portion 16c which extends through the evaporator and portion 16b which passes across the evaporator at the entering air end of the evaporator. Portion 16b of section 16 is connected to line 6 by means of line 10. Portion 16b of section 16 is connected to suction line 13 leading to compressor 2.

Control means 17 is connected to section 16 for a purpose hereinafter described. Preferably, control 17 is connected to section 16 between the leaving air side of evaporator 7 and the entering air side of the evaporator. The direction of air passing through the evaporator is shown by the arrow. The control means 17 may be actuated automatically by means of a temperature responsive element T disposed, for example, in the path of air entering evaporator 7. A line 18 connects compressor 2 with control means 17, and portion 16a of section 16, depending upon the operation of control means 17.

Figure 4:
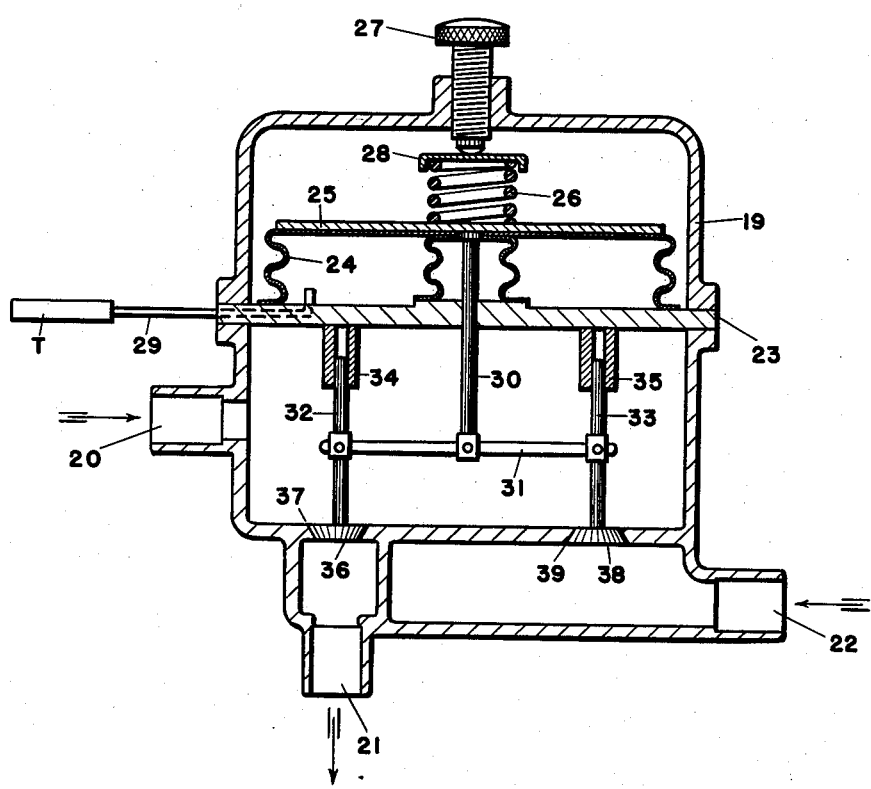
Figure 4 is a sectional view of a control valve for use in the system.

It will be understood control means 17 may comprise pneumatic valves or solenoid valves, for example, but preferably control means 17 consists of an automatically operable three-way valve, shown in Figure 4. The valve shown in Figure 4 comprises a casing 19 containing an inlet passage 20 adapted to receive refrigerant from line 10 and the leaving air portion 16a of section 16, such refrigerant passing through the valve and outlet 21 to the entering air portion 16b of section 16; the refrigerant then passes into suction line 13 and is returned to compressor 2. A second inlet 22 is provided which permits the entrance of hot refrigerant gas from compressor 2 into the valve.

A plate 23 separates the upper and lower portions of the valve. A bellows 24 is disposed in the upper portion of the valve and is connected to a second plate 25. Spring 26 is disposed in engagement with plate 25 to impose a predetermined pressure upon bellows 24. The pressure applied by spring 26 may be regulated by means of an adjusting screw 27 which applies a predetermined force to spring positioning cap 28. An opening not shown is provided in plate 23 and connects the interior of bellows 24 with tube 29 connecting it to bulb T. Expansion and contraction of bellows 24 is controlled by means of vapor pressure of fluid in bulb T. Spring 26 is disposed in such a manner as to oppose the expansion of bellows 24. It will be understood suitable manual controls may be provided in place of bulb T.

A rod 30 is attached at one end to plate 25 and, at its opposite end to a whiffletree 31. Rods 32 and 33 are provided on opposite ends of whiffletree 31. One end of rod 32 is disposed in guide 34 attached to plate 23, and one end of rod 33 is disposed in guide 35, also attached to plate 23. A valve member 36 is secured to the opposite end of rod 32 and is adapted to co-operate with valve seat 37, to prevent passage of fluid between inlet 20 and outlet 21. Rod 33 carries valve member 38 at its opposite end. Valve member 38 is adapted to co-operate with valve seat 39 to prevent refrigerant, entering the housing through inlet 22, from passing through the valve.

Figure 5:
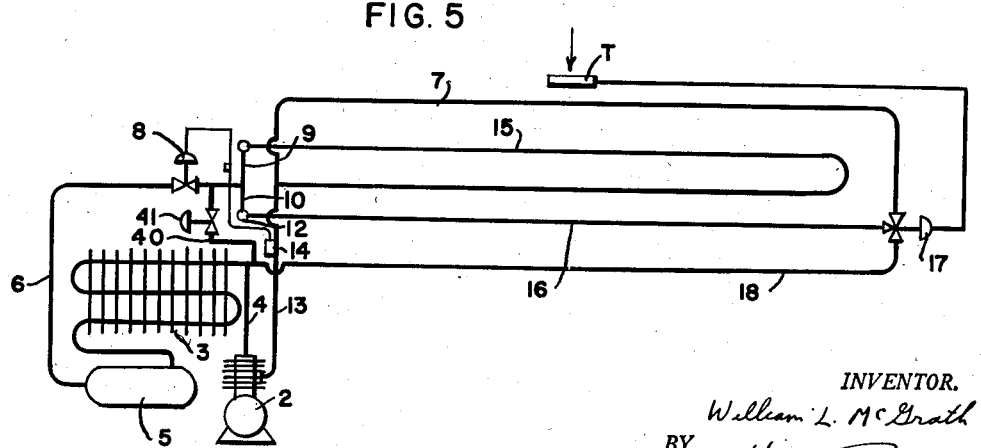
Figure 5 is a diagrammatic view of a modification of the invention.

If desired, as shown in Figure 5, a bypass line 40 and suitable control means 41 may be provided to vary the temperature of evaporator 7 by feeding hot gas from compressor 2 to line 6 thus permitting compressed refrigerant gas and liquid refrigerant to be supplied in any desired ratio to the evaporator.

Under full load conditions, the operation of the system is as follows: Hot compressed gaseous refrigerant from compressor 2 passes through line 4 to condenser 3, is condensed and passes to receiver 5. Liquid refrigerant passes from receiver 5 through liquid line 6 to expansion valve 8; from expansion valve 8 refrigerant flows through lines 9 and 10 to the various evaporator sections 15 and 16. Restrictions 11 and 12 disposed in lines 9 and 10, respectively, serve to establish a decrease in pressure of refrigerant passing to the evaporator sections 15 and 16. Air passes through the evaporator 7 in the direction of the arrow. The expanded refrigerant flows into the sections 15 and 16, and cools or decreases the temperature of air passing through the evaporator below its dew-point, thereby decreasing the amount of moisture carried by such air. The gaseous refrigerant formed in the evaporator sections then passes by suction line 13 to compressor 2.

Assume there is a drop in temperature of air being directed through evaporator 7. Thermal element T, as shown, is responsive to the temperature of air being directed to evaporator 7, although it will be understood it may be responsive to temperature of return air or the like or, if desired, element T may be placed in a room being conditioned to respond to temperature of the air in the room; element T controls the operation of valve 17. Upon a decrease in temperature of such air, element T actuates valve 17 to close section 16 to the passage of condensed refrigerant (refrigerant from line 10). Assuming the temperature of air directed to the evaporator continues to decrease, element T actuates valve 17 to open inlet 22 permitting hot gaseous refrigerant from compressor 2 to pass to section 16 to heat the air passing therethrough. The hot gaseous refrigerant supplied to coil 16 causes pressure to increase in such coil. When the pressure in the coil increases to a point equal to the saturation pressure corresponding to the dry bulb temperature of the air leaving the remaining section or sections of the evaporator, as shown in Figure 1, condensation of the gaseous refrigerant begins. The condensed refrigerant flows through restriction 12 into line 9 and into evaporator section 15 where it is re-evaporated and used to cool and to dehumidify air passing through such portion of the evaporator. Under some conditions, insufficient liquid is condensed in section 16 to supply the requirements of section 15. In such a case, expansion valve 8 opens sufficiently to supply any required amount of liquid refrigerant to section 15.

If the temperature of the air passing through the evaporator continues to decrease, more hot gaseous refrigerant from compressor 2 is supplied to section 16 thus causing pressure in section 16 to increase. As the pressure in section 16 increases, gaseous fluid therein condenses at a higher temperature and thus raises the dry bulb temperature of the air leaving such portion of the evaporator. As the temperature of air directed to the evaporator increases, valve 17 serves to decrease the amount of gaeous refrigerant passing into section 16. Upon a further increase in temperature of such air, valve 17 closes gradually and prevents passage of hot gas into section 16 and will then gradually open outlet 21 and permit condensed refrigerant to pass through section 16 to suction line 13 until capacity balance is again established.

Figure 2:
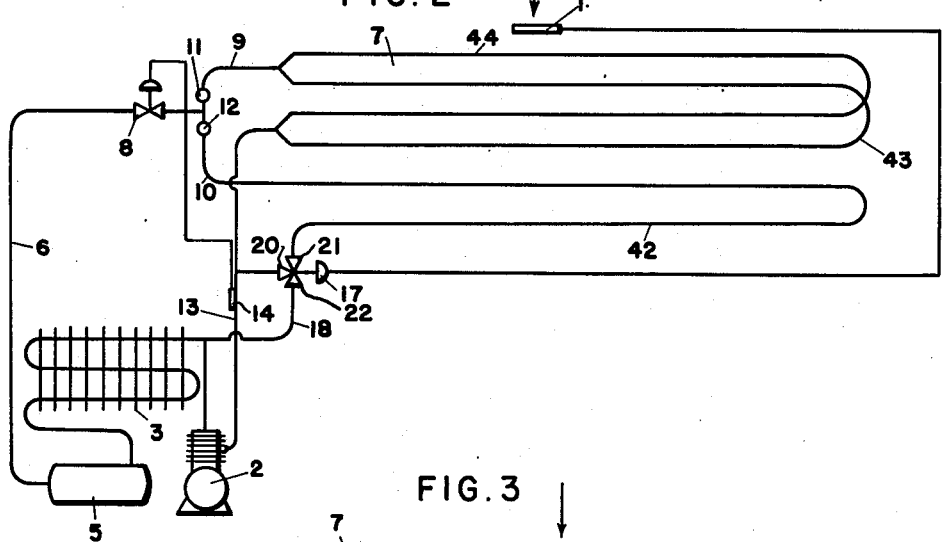
Figure 2 is a diagrammatic view of a refrigerating and air conditioning system, similar to Figure 1, illustrating a modified form of evaporator.

In Figure 2, I have shown another embodiment of the invention including a modified form of heat exchange surface. In the system shown in Figure 2, evaporator 7 comprises a plurality of sections 42, 43, and 44. As illustrated, section 42 is disposed at the leaving air end of the evaporator 7. Refrigerant passes through restriction 11 and line 9 into sections 43 and 44, the evaporated refrigerant passing into suction line 13 and returning to compressor 2. Condensed refrigerant passes through restriction 12 into line 10 and through coil 42 to suction line 13 to be returned to compressor 2. The above description contemplates normal operation of the evaporator at full load.

Line 18 connects compressor 2 with coil 42 of evaporator 7. Heating fluid passes through line 18 and control valve 17 into section 42. Bulb T is responsive to the temperature of air directed to the evaporator; in response to decrease in such temperature, it actuates valve 17 to shut off coil 42 from suction line 13. A further decrease in temperature of air directed to evaporator 7 causes control valve 17 to open gradually, permitting hot gas from compressor 2 to be supplied to coil 42. Restriction 12 in line 10 prevents such gas from flowing back through the coil in any substantial quantity.

Pressure in section 42 begins to increase; when its rises to a point equal to the saturation pressure corresponding to the dry bulb temperature of air leaving sections 43 and 44, condensation in section 42 begins. As a result of such condensation, the temperature of air leaving evaporator 7 is increased; liquid refrigerant condensed in coil 42 flows through restriction 12 into sections 43 and 44, where it will be again evaporated and used to cool and to dehumidify air passing through such coils. As air temperature continues to decrease, the valve port in control means 17 opens still wider and permits pressure in coil 42 to increase, thereby condensing refrigerant at a higher temperature and further increasing the dry bulb temperature of air leaving the evaporator.

In the heat exchanger or evaporator illustrated in Figure 2, there exists a theoretical possibility that wet gas may be discharged into suction line 13, reducing the superheat in the suction line causing the thermal expansion valve to throttle the flow of refrigerant. This may result in a lower evaporator pressure during the period valve 17 is exerting a throttling action. This is not a serious disadvantage so long as the proportion of heat exchange surface used is small; the reduction in suction pressure will not be so great as to cause frosting on the coil. If the valve closes rapidly as by snap-action, this disadvantage is eliminated. The effect is eliminated completely by the heat exchange structure shown in Figure 1 in which a clean-up section is provided on the entering air side of the evaporator. In such structure, as the valve 17 throttles, any liquid refrigerant which passes into this portion of section 16 is immediately evaporated; thus, the operation of the expansion valve 8 is not affected by wet gas entering the suction line during the time valve 17 exerts a throttling action.

Figure 3:
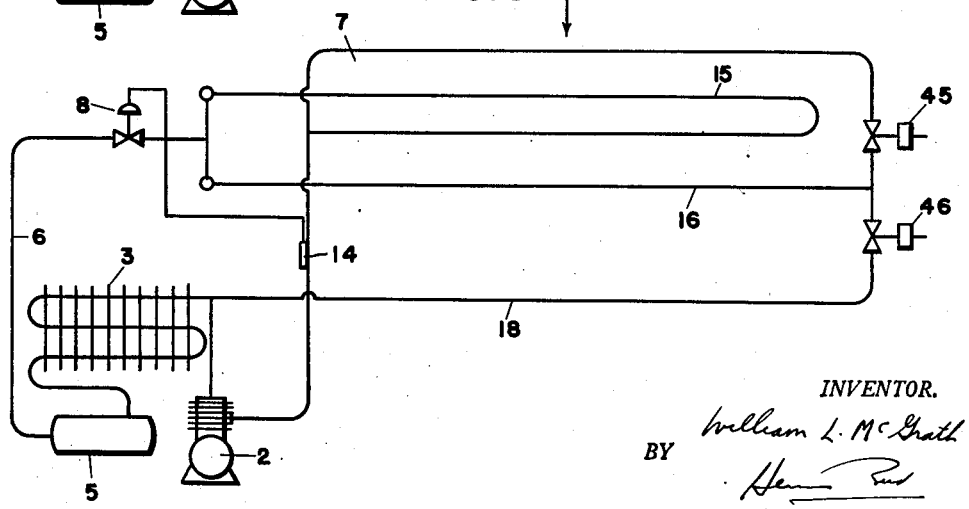
Figure 3 is a diagrammatic view of a refrigerating and air conditioning system, similar to Figure 1, illustrating a modified form of control means.

It will be appreciated an automatic control valve as illustrated in Figure 4 is not essential in my invention. In Figure 3, I have illustrated a system utilizing pneumatic control valves 45 and 46 in place of control valve 17. In other respects, the system illustrated is similar to the system shown in Figure 1. In operation, valve 45 is closed gradually, and then valve 46 is opened gradually upon a drop in temperature of the air passing through the evaporator, room temperature, or the like. Upon a rise in temperature, valve 46 is closed gradually, and then valve 45 is opened.

My invention provides a simple, ready, and inexpensive means of attaining capacity control in air conditioning systems; if desired, such means may be readily included in the equipment at the place of manufacture or at the place of use. Extensive or expensive additional equipment is not required since the invention utilized a portion of the existing heat exchange surface. Such portion, of course, at partial load is not required for cooling purposes. Utilization of a portion of the evaporator coil eliminates the additional space required and an increase in air resistance obtained if additional heat exchange surface were provided. The invention obviates clammy, muggy, or damp conditions under partial load and provides capacity control by the use of reheated or dehumidified air without requiring the use of additional coils or coil surface for heat exchange purposes. The rate of moisture removal, as well as the rate of sensible heat absorption is controlled even under conditions of partial load of the equipment. The capacity of the system may be varied in response to the load imposed thereon, thus obviating unsatisfactory performance under conditions of partial load.

While I have described and illustrated certain preferred embodiments of my invention, it will be understood my invention is not limited thereto since it may be otherwise embodied within the scope of the following claims.

I claim:

1. In a system of the character described, the combination of a compressor, a condenser connected to said compressor, a heat exchanger connected to said condenser, a suction line connecting said exchanger with said compressor, said exchanger including a plurality of sections for the evaporation of cooling fluid, expansion means for regulating the amount of cooling fluid passing to the exchanger, a plurality of lines connecting said means with said evaporator sections, constrictions in said lines connecting the regulating means with the evaporator sections restricting the amount of cooling fluid passing into said sections, a heating fluid line connecting the compressor with one of said exchanger sections, control means for controlling the passage of heating fluid from the compressor to said exchanger section, a temperature responsive bulb for actuating said control means, said control means, in response to a decrease in temperature indicated by said bulb, decreasing the amount of cooling fluid passing into said section, and, in response to a further decrease in such temperature indicated by said bulb, discontinuing the passage of cooling fluid therethrough and permitting the passage of heating fluid only therein, said control means at substantially full capacity operation preventing the passage of heating fluid from the compressor to said exchanger section while permitting the passage of cooling fluid only.

2. In a system of the character described, the combination of a compressor, a condenser, a discharge line connecting said compressor and said condenser, a heat exchanger having a plurality of sections for the passage of fluid therethrough, a suction line connecting said compressor with said exchanger, an expansion valve disposed in a line connecting the condenser and the exchanger, a plurality of lines connecting said expansion valve with said exchanger sections, constrictions in said connecting lines disposed between the exchanger sections and said expansion valve for distributing the cooling fluid passing to said sections, a temperature responsive element for controlling the operation of said expansion valve, said element being disposed adjacent said suction line, one of said exchanger sections extending through the leaving air end of said exchanger and then through the entering air end, said exchanger being connected to the suction line, a control valve adapted to open and close said exchanger section which extends through the entering air end of the exchanger and through the leaving air end automatically to the passage of cooling fluid, a line directly connecting said compressor with said control valve, and a second temperature responsive element disposed in the path of air being directed to the exchanger for controlling the operation of said control valve, said control valve serving automatically to close said section to the passage of cooling fluid as the temperature of air being directed to the exchanger tends to decrease and, as the temperature of air being directed to said exchanger tends to further decrease, connecting at least a portion of said section with the compressor to permit the passage of heating fluid into the leaving air end portion of said section thereby reheating air passing through the exchanger.

3. In a refrigeration system, the combination of a compressor, a condenser, a heat exchanger, and means for metering the amount of cooling fluid passing to said exchanger, said compressor, condenser, exchanger and metering means forming a closed circuit, said exchanger including a plurality of separate sections, one of said exchanger sections extending through the leaving air portion of said exchanger and then through the entering air portion of said exchanger, the entering air portion of said section being connected to a suction line leading to the compressor under normal conditions of operation refrigerant flowing through the leaving air portion and then through the entering air portion to the suction line, a second line connecting said section having a leaving air portion directly to said compressor to permit heating fluid to pass from the compressor into the leaving air portion of said section, and means for controlling the passage of heating fluid from the compressor into the leaving air portion of said section, heating fluid condensing in the leaving air portion and passing to the remaining sections of the exchanger.

4. In a method of providing capacity control for a direct expansion air conditioning system, the steps which comprise passing condensed fluid through a plurality of separate sections in an evaporator to adjust the temperature and moisture content of air passing therethrough; reducing the amount of condensed fluid passing through one of said sections in response to a decrease in the temperature of air directed to the evaporator; then discontinuing the passage of condensed fluid to said section receiving a reduced amount of condensed fluid; permitting the passage of heating fluid in said section to which passage of condensed fluid has been discontinued in response to a further decrease in the temperature of air directed to the evaporator; permitting the pressure of heating fluid in said section to increase until passage of air therethrough liquefies the fluid to some extent while reducing the moisture content of such air; and permitting the passage of the liquid to the remaining sections of the evaporator to cool air passing therethrough.

5. In a method of providing capacity control for a direct expansion air conditioning system, the steps which consist in passing liquid refrigerant into a plurality of separate sections in an evaporator to adjust the temperature and moisture content of air passing through the evaporator; reducing the amount of liquid refrigerant passing into one of the sections in response to a decrease in the temperature of air directed to the evaporator; then discontinuing passage of liquid refrigerant to said section receiving a reduced amount of liquid refrigerant in response to a further decrease in the temperature of air directed to the evaporator; and passing hot gaseous refrigerant into said section in which passage of liquid refrigerant has been discontinued to heat the air passing therethrough.

6. In a method of providing capacity control for a direct expansion air conditioning system, the steps which consist in passing liquid refrigerant into a plurality of separate sections in an evaporator to adjust the temperature and moisture content of air passing through the evaporator, one section of said evaporator having a portion extending through the entering air end of the evaporator and a second portion extending through the leaving air end of the evaporator; reducing the amount of liquid refrigerant passing into the leaving air portion of said section in response to a decrease in the temperature of air directed to the evaporator; then discontinuing passage of liquid refrigerant to the leaving air end of said section in response to a further decrease in the temperature of air directed to the evaporator; passing hot gaseous refrigerant into the leaving air portion of said section, permitting the pressure of the hot gaseous refrigerant in said leaving air portion to increase until passage of air therethrough liquefies the gaseous refrigerant to some extent, and passing the liquid refrigerant from the leaving air portion of said section to remaining sections of the evaporator.

7. In a refrigeration system, the combination of a compressor, a condenser connected to said compressor, a heat exchanger connected to the condenser for adjusting the temperature and moisture content of air passing therethrough, said exchanger including a plurality of sections, one of said sections having a portion extending through the leaving air end of the evaporator and a second portion extending through the entering air end of the evaporator, a suction line connecting the sections of the evaporator with the compressor, means for metering the amount of cooling fluid passing to the evaporator, a heating fluid line connecting the compressor with the section portion placed in the leaving air end of the evaporator, and control means for controlling the passage of heating fluid from the compressor to said section portion placed in the leaving air end of the evaporator.

WILLIAM L. McGRATH.

REFERENCES CITED

The following references are of record in the file of this patent:

UNITED STATES PATENTS

| Number | Name | Date |
| --- | --- | --- |
| 2,195,781 | Newton | Apr. 2, 1940 |
| 2,344,215 | Soling et al. | Mar. 14, 1944 |
| 2,403,818 | McGrath | July 9, 1946 |
| 2,451,385 | Groat | Oct. 12, 1948 |
| 2,515,842 | Swinburne | July 18, 1950 |